United States Patent
Lee et al.

(10) Patent No.: US 11,387,687 B2
(45) Date of Patent: Jul. 12, 2022

(54) DATA COMMUNICATION METHOD FOR WIRELESS CHARGING AND ELECTRONIC DEVICE USING SAME

(71) Applicant: Samsung Electronics Co., Ltd., Gyeonggi-do (KR)

(72) Inventors: Wooram Lee, Gyeonggi-do (KR);
Kangjun Ko, Gyeonggi-do (KR);
Kwangseob Kim, Gyeonggi-do (KR);
Minji Chae, Gyeonggi-do (KR);
Youngmi Ha, Gyeonggi-do (KR);
Dongzo Kim, Gyeonggi-do (KR);
Mincheol Ha, Gyeonggi-do (KR)

(73) Assignee: Samsung Electronics Co., Ltd

( * ) Notice: Subject to any disclaimer, the term of this patent is extended or adjusted under 35 U.S.C. 154(b) by 185 days.

(21) Appl. No.: 16/782,535

(22) Filed: Feb. 5, 2020

(65) Prior Publication Data

US 2020/0266675 A1  Aug. 20, 2020

(30) Foreign Application Priority Data

Feb. 19, 2019 (KR) .......................... 10-2019-0019106

(51) Int. Cl.
*H02J 50/80* (2016.01)
*H02J 50/10* (2016.01)
*H02J 7/00* (2006.01)

(52) U.S. Cl.
CPC .......... *H02J 50/80* (2016.02); *H02J 7/00034* (2020.01); *H02J 7/00045* (2020.01); *H02J 7/0047* (2013.01); *H02J 50/10* (2016.02)

(58) Field of Classification Search
CPC .. H02J 50/80; H02J 50/90; H02J 50/12; H02J 50/70; H02J 7/025; H02J 50/60;

(Continued)

(56) References Cited

U.S. PATENT DOCUMENTS 9,965,009 B1 * 5/2018 Bell ........................ G06F 1/266
10,651,694 B2  5/2020 Park (Continued)

FOREIGN PATENT DOCUMENTS

GB 2 472 700 2/2011
KR 10-2017-0065228 6/2017

(Continued)

OTHER PUBLICATIONS

International Search Report dated Apr. 29, 2020 issued in counterpart application No. PCT/KR2020/001016, 10 pages.

(Continued)

*Primary Examiner* — Binh C Tat
(74) *Attorney, Agent, or Firm* — The Farrell Law Firm, P.C.

(57) ABSTRACT

An electronic device is includes battery; coil; wireless charging circuit electrically connected to coil; power management module configured to control charge state of battery by using power supplied from receiving circuit; and processor operatively connected to wireless charging circuit and power management module, wherein processor is configured to request configuration information for performing wireless charging from external device through the wireless charging circuit; determine whether wireless charging is possible, based on a response to the request for configuration information; when the wireless charging is possible, request encrypted authentication information from the external device so as to perform authentication with respect to the external device; when the external device is an unauthenticated device, request the external device to transmit a first predetermined power; and when the external device is an authenticated device, request the external device to transmit a second predetermined power that is higher than the first predetermined power.

14 Claims, 9 Drawing Sheets

(58) Field of Classification Search
CPC .. H02J 50/50; H02J 50/40; H02J 5/005; H02J 7/0047; H02J 50/005; H02J 50/10; H02J 7/00; H02J 7/0042; H02J 7/00045; H02J 7/0027; H02J 7/0029; H02J 7/0044; H02J 2310/22; H02J 7/00034; H02J 7/00036; H02J 7/0013; H02J 7/00304; H02J 7/045; H02J 50/402; H02J 7/00309; H02J 50/05; H02J 50/502; H02J 50/20; H02J 50/23; H02J 2310/48; H02J 7/35; H02J 2310/40; H02J 3/322; H02J 50/001; H02J 7/007; H02J 7/02; H02J 2207/40; H02J 2300/26; H02J 3/381; H02J 3/385; H02J 50/00; H02J 7/0048; H02J 7/00712; H02J 7/0077; H02J 7/0021; H02J 7/0068; H02J 13/00016; H02J 50/15; H02J 50/30; H02J 7/0045; H02J 7/342; H02J 2310/46; H02J 50/27; H02J 7/04; H02J 13/00024; H02J 13/00026; H02J 13/0075; B60L 53/122; B60L 53/22; B60L 53/53; H04L 2209/805; H04L 63/0428; H04L 12/2809; H01F 27/36; H01F 27/363; H01F 27/361; H01F 5/003; H01Q 1/3275; H01Q 21/30; H01Q 21/28; H01Q 1/2283
USPC .................................................. 320/106–115
See application file for complete search history.

(56) References Cited

U.S. PATENT DOCUMENTS

| | | |
|---|---|---|
| 2007/0021140 A1 | 1/2007 | Keyes, IV et al. |
| 2010/0270969 A1 | 10/2010 | Sip |
| 2013/0257364 A1 | 10/2013 | Redding |
| 2015/0006395 A1 | 1/2015 | Chu |
| 2017/0077715 A1 | 3/2017 | Corum et al. |
| 2017/0163076 A1 | 6/2017 | Park et al. |
| 2017/0201130 A1* | 7/2017 | Park .................... H02J 7/00045 |
| 2019/0021001 A1* | 1/2019 | Park .................... H02J 7/00034 |
| 2019/0044393 A1 | 2/2019 | Louis |
| 2019/0068005 A1 | 2/2019 | Wang et al. |

FOREIGN PATENT DOCUMENTS

| | | |
|---|---|---|
| KR | 10-1785648 | 10/2017 |
| KR | 10-2019-0006852 | 1/2019 |
| KR | 1020190087995 | 7/2019 |
| WO | WO 2017/044285 | 3/2017 |
| WO | WO 2017/213428 | 12/2017 |

OTHER PUBLICATIONS

European Search Report dated Feb. 4, 2022 issued in counterpart application No. 20758840.1-1202, 9 pages.

* cited by examiner

DATA COMMUNICATION METHOD FOR WIRELESS CHARGING AND ELECTRONIC DEVICE USING SAME

CROSS-REFERENCE TO RELATED APPLICATION(S)

This application is based on and claims priority under 35 U.S.C. § 119 to Korean Patent Application No. 10-2019-0019106, filed on Feb. 19, 2019, in the Korean Intellectual Property Office, the disclosure of which is incorporated herein by reference in its entirety.

BACKGROUND

1. Field

The disclosure relates to a data communication method for wireless charging and an electronic device using the same.

2. Description of Related Art

Recently, a wireless charging or contactless charging technology has been developed and applied to various electronic devices.

The wireless charging technology allows a battery of an electronic device to be charged without being connected to a wired charger, for example, a technology which allows a battery to be charged by simply placing a smart phone or a wearable device on a charging pad or a charging cradle.

In performing wireless charging, an authentication procedure of a power transmission device or a power reception device may be required. Through the authentication procedure, the power transmission device and the power reception device may identify information (e.g., a maximum power) supported by a counterpart device. In the case of charging between the power transmission device and the power reception device for which authentication has not been performed, the device may be damaged due to overcharging or may not be properly charged and thus may result in inconvenience to a user.

SUMMARY

An aspect of the present disclosure provides a data communication method for wireless charging and an electronic device using the same, which may perform wireless charging on an authenticated device with a predetermined power, through encryption authentication between a power transmission device and a power reception device, reduce damage to a battery due to overcharging, and perform wireless charging more quickly.

In accordance with an aspect of the present disclosure, an electronic device is provided. The electronic device includes a battery; a coil; a wireless charging circuit electrically connected to the coil; a power management module configured to control a charge state of the battery by using power supplied from a receiving circuit; and a processor operatively connected to the wireless charging circuit and the power management module, wherein the processor is configured to request configuration information for performing wireless charging from an external device through the wireless charging circuit; determine whether the wireless charging is possible, based on a response to the request for configuration information; when the wireless charging is possible, request encrypted authentication information from the external device so as to perform authentication with respect to the external device; when the external device is an unauthenticated device, request the external device to transmit a first predetermined power; and when the external device is an authenticated device, request the external device to transmit a second predetermined power that is higher than the first predetermined power.

In accordance with another aspect of the present disclosure, an electronic device is provided. The electronic device includes a battery; a coil; a wireless charging circuit electrically connected to the coil; a power management module configured to control a charge state of the battery by using a voltage supplied from the wireless charging circuit; and a processor operatively connected to the wireless charging circuit and the power management module, wherein the processor is configured to request configuration information for performing wireless charging from an external device through the wireless charging circuit; determine whether the external device can perform the wireless charging, based on a response to the request for configuration information; when the wireless charging is possible, request identification information of the external device from the external device so as to determine whether the external device can transmit a second predetermined voltage greater than a first predetermined voltage; request encrypted authentication information related to the second predetermined voltage from the external device, based on determining that the external device can transmit the second predetermined voltage; perform authentication with respect to the external device, based on a response to the encrypted authentication information request; and when the external device is an authenticated device, request the external device to transmit the second predetermined voltage, based on a result of the authentication.

In accordance with another aspect of the present disclosure, a wireless charging transmitter is provided. The wireless charging transmitter includes a coil; a wireless charging circuit electrically connected to the coil; and a controller operatively connected to the wireless charging circuit, wherein the controller is configured to, when the controller receives a request for performing wireless charging from a wireless charging receiver, transmit configuration information to the wireless charging receiver; when the wireless charging receiver requests identification information as a response to the transmission of the configuration information, transmit the identification information including information on a maximum transmittable wireless power; receive a request for encrypted authentication information from the wireless charging receiver, as a response to the transmission of the identification information; transmit the encrypted authentication information in response to the request for the encrypted authentication information; when the wireless charging receiver transmits an authentication completion message as a response to the transmission of the encrypted authentication information, transmit a second predetermined power to the wireless charging receiver; and when the wireless charging receiver transmits an authentication failure message as a response to the transmission of the encrypted authentication information, transmit a first predetermined power that is lower than the second predetermined power to the wireless charging receiver.

In accordance with another aspect of the present disclosure, a method for wirelessly charging an electronic device is provided. The method includes, through a wireless charging circuit, requesting configuration information for performing wireless charging from an external device so as to determine whether the wireless charging is possible; when the wireless charging is possible, requesting encrypted authentication information from the external device so as to perform authentication with respect to the external device; when the external device is an unauthenticated device, requesting the external device to transmit a first predetermined power; and when the external device is an authenticated device, requesting the external device to transmit a second predetermined power that is higher than the first predetermined power.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
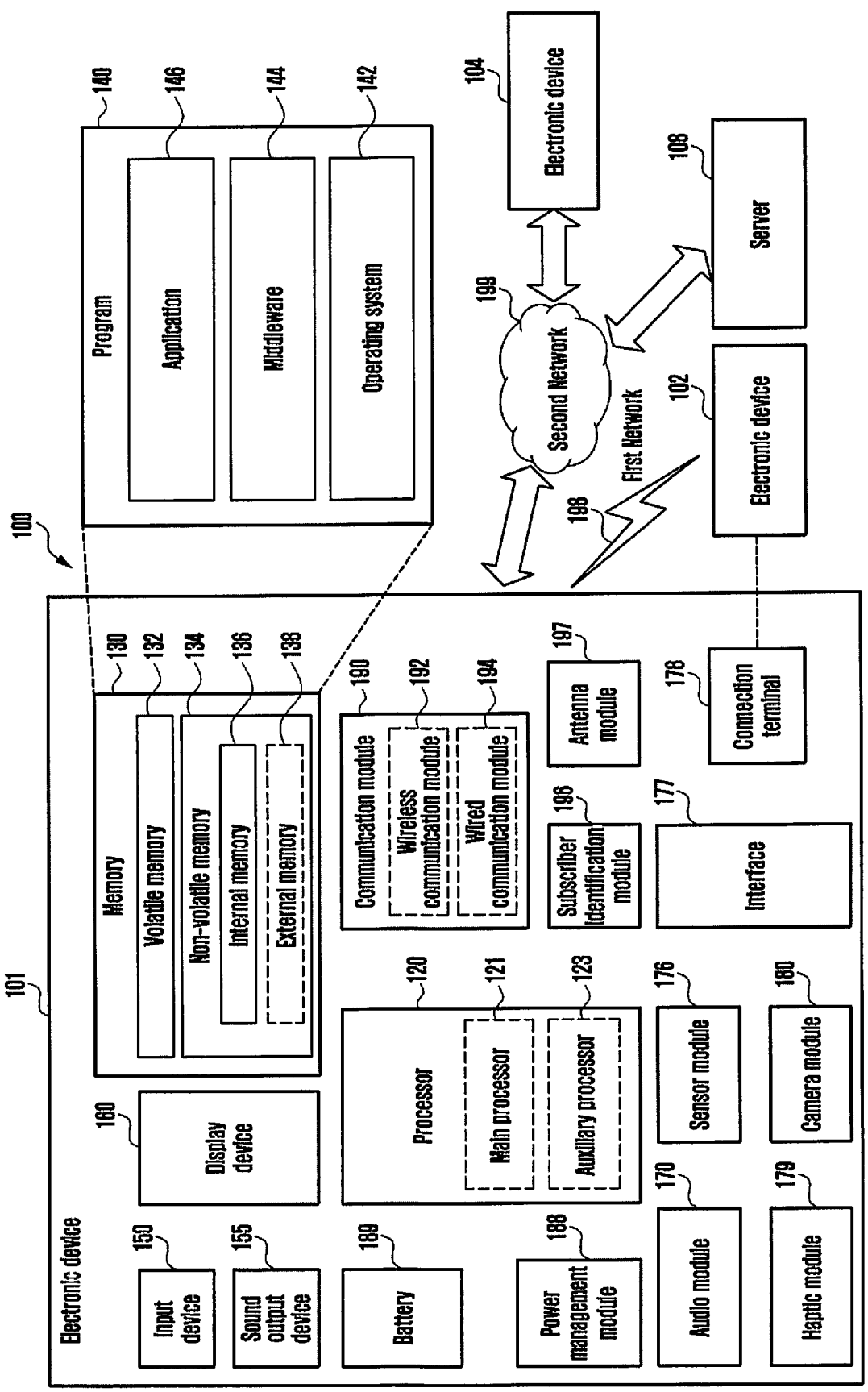
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
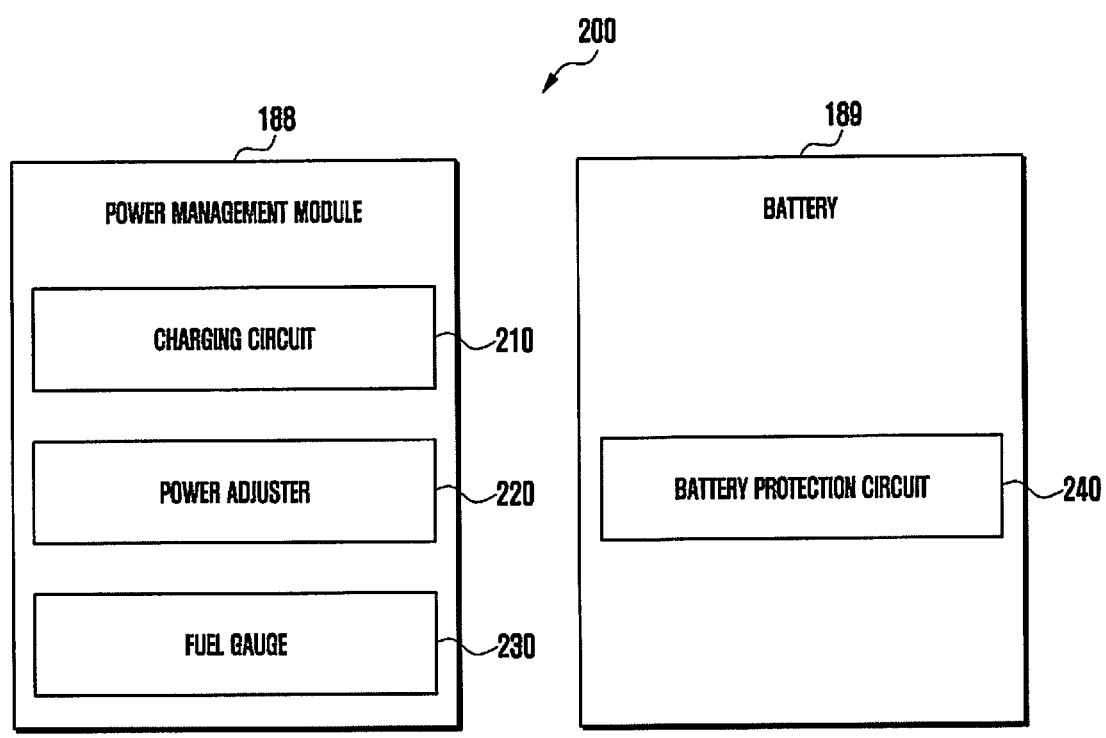
FIG. 2 is a block diagram of a power management module and a battery according to an embodiment.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
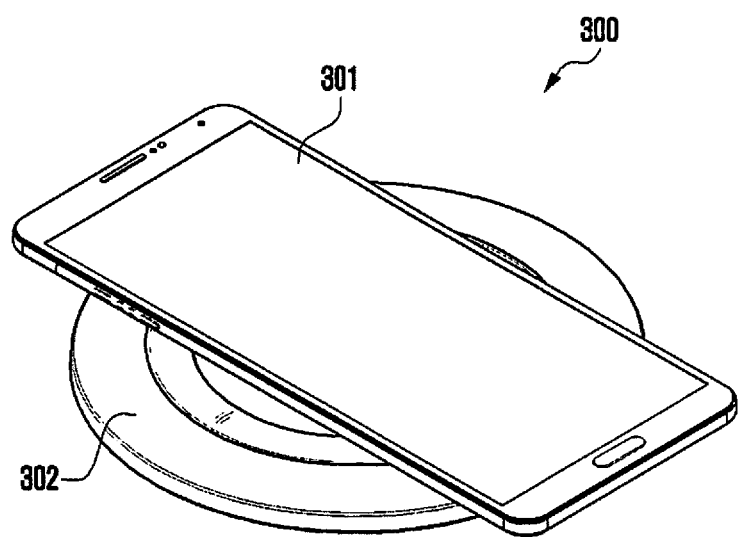
FIG. 3 is an illustration of a wireless charging system according to an embodiment.

FIG. 3 is an illustration of a wireless charging system 300 according to an embodiment.

Referring to FIG. 3, the wireless charging system 300 may include an electronic device 301 such as a portable terminal (e.g., an electronic device 101), or an external electronic device 302 such as a wireless charging pad (e.g., an external electronic device 102).

The electronic device 301 may be placed on a pad of the external electronic device 302 and, thus, perform wireless charging. For example, the external electronic device 302 may be a device which supports a general wireless charging mode, a fast wireless charging mode, or a higher fast wireless charging mode. The fast wireless charging mode disclosed in the present disclosure (for example, a power reception device receives power at about 7 watts (W) to 8 W) may refer to a wireless charging scheme having a faster charging speed and a greater amount of wireless transmission power than the general wireless charging mode (for example, the power reception device receives power at about 3.0 W to 5 W). The higher fast wireless charging mode disclosed in the present disclosure (for example, the power reception device receives power at about 11 W to 12 W) may refer to a wireless charging scheme having a faster charging speed and a greater amount of wireless transmission power than the fast wireless charging mode.

The electronic device 301 may determine whether the external electronic device 302 is a device which supports a higher fast wireless charging mode, and, if the external electronic device 302 is a device which supports the higher fast wireless charging mode, exchange at least one encryption authentication information with the external electronic device 302 to perform an authentication procedure. Although the external electronic device 302 is a device which supports the higher fast wireless charging mode, the electronic device 301 may be controlled to be wirelessly charged in the higher fast wireless charging mode only in a case where at least one piece of encryption authentication information received from the external electronic device 302 is valid. For example, the electronic device 301 may be controlled to be wirelessly charged in a general wireless charging mode or a fast wireless charging mode in the case where at least one piece of encryption authentication information received from the external electronic device 302 is not valid.

In relation to the wireless charging system 300, only an authenticated device may perform wireless charging by using a predetermined power, through encryption authentication between a power transmission device (e.g., the external electronic device 302) and a power reception device (e.g., the electronic device 301), the damage of a battery due to overcharging may be reduced, and wireless charging may be performed more quickly.

According to an embodiment, an electronic device may include a battery, a coil, a wireless charging circuit electrically connected to the coil, a power management module configured to control a charge state of the battery by using power supplied from a receiving circuit; and a processor operatively connected to the wireless charging circuit and the power management module, wherein the processor, through the wireless charging circuit, requests configuration information for performing wireless charging from an external device; determines whether the wireless charging is possible, based on a response to the request; if the wireless charging is possible, requests encrypted authentication information from the external device so as to perform authentication with respect to the external device; if the external device is an unauthenticated device, requests the external device to transmit a first predetermined power; and if the external device is an authenticated device, requests the external device to transmit a second predetermined power higher than the first predetermined power.

In determining whether the wireless charging is possible, the processor may request identification information from the external device, receive the identification information of the external device from the external device, and determine whether the external device is a device which can transmit a maximum of the first predetermined power or a device which can transmit the second predetermined power, based on the identification information of the external device. If the external device can transmit a maximum of the second predetermined power, the processor may request the encrypted authentication information from the external device, and if the external device can transmit a maximum of the first predetermined power, the processor may request the external device to transmit the first predetermined power. The processor may transmit the request for the first predetermined power to the external device, based on the identification information of the external device, charge the battery, based on the transmission of the first predetermined power by the external device, and request the encrypted authentication information from the external device while charging the battery, based on the transmission of the first predetermined power. The processor may determine whether wireless charging is possible, based on the configuration information of the external device, and if the wireless charging is possible, the processor may determine whether the external device can perform fast wireless charging, based on the identification information of the external device. The electronic device may further include an encryption authentication module for performing the authentication. The encryption authentication module may be embedded in the processor.

According to an embodiment, an electronic device may include a battery, a coil, a wireless charging circuit electrically connected to the coil, a power management module configured to control a charge state of the battery by using a voltage supplied from the wireless charging circuit, and a processor operatively connected to the wireless charging circuit and the power management module, wherein the processor, through the wireless charging circuit, requests configuration information for performing wireless charging from an external device; determines whether the external device can perform the wireless charging, based on a response to the request; if the wireless charging is possible, requests identification information of the external device from the external device so as to determine whether the external device can transmit a second predetermined power greater than a first predetermined power; requests encrypted authentication information associated with the second predetermined power from the external device, based on the determination, so as to perform authentication with respect to the external device, based on a response to the encrypted authentication information request; and if the external device is an authenticated device, requests the external device to transmit the second predetermined power, based on a result of the authentication. If the external device is an unauthorized device, the processor may request the external device to transmit the first predetermined power. The electronic device may further include an encryption authentication module for performing the authentication. The encryption authentication module may be embedded in the processor.

According to an embodiment, a wireless charging transmitter may include a coil, a wireless charging circuit electrically connected to the coil, and a controller operatively connected to the wireless charging circuit, wherein the controller is configured to, if the controller receives a request for performing wireless charging from a wireless charging receiver, transmit configuration information to the wireless charging receiver; if the wireless charging receiver requests identification information as a response to the transmission of the configuration information, transmit the identification information including information on a maximum transmittable wireless power; receive a request for encrypted authentication information from the wireless charging receiver as a response to the transmission of the identification information; transmit the encrypted authentication information in response to the request for the encrypted authentication information; if the wireless charging receiver transmits an authentication completion message as a response to the transmission of the encrypted authentication information, transmit a second predetermined power to the wireless charging receiver; and if the wireless charging receiver transmits an authentication failure message as a response to the transmission of the encrypted authentication information, transmit a first predetermined power lower than the second predetermined power to the wireless charging receiver. The maximum transmittable wireless power may be the first predetermined power or the second predetermined power. The controller may be configured to receive a request for the encrypted authentication information from the wireless charging receiver, based on transmitting the maximum transmittable wireless power as the second predetermined power. If the maximum transmittable wireless power is the first predetermined power, the controller transmits, to the wireless charging receiver, a command for configuring a transmission power as the first predetermined power. The controller may be configured to receive a request for the encrypted authentication information while transmitting the first predetermined power to the wireless charging receiver, and transmit the encrypted authentication information in response to the request.

Figure 4:
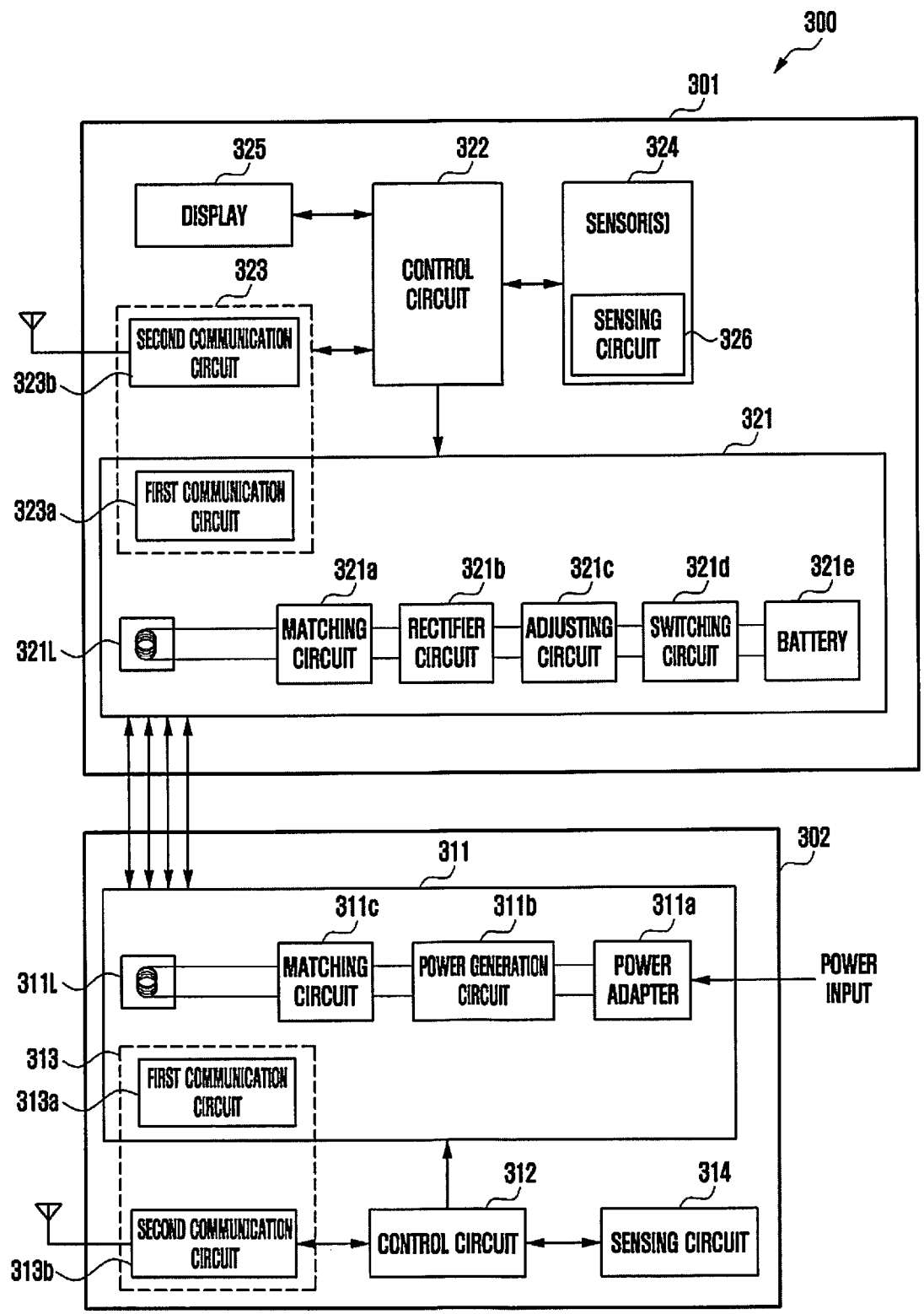
FIG. 4 is a block diagram of a wireless charging system according to an embodiment.

FIG. 4 is a block diagram of the wireless charging system 300 according to an embodiment.

Referring to FIG. 4, the external electronic device 302 (e.g., a power transmission device) may wirelessly supply power to the electronic device 301 (e.g., a power reception device). The electronic device 302 may be a wireless power transmitter or an electronic device which operates in a power transmission mode (for example, the same electronic device as the electronic device 101).

The power transmission device 302 may include a power transmission circuit 311, a control circuit 312, a communication circuit 313, or a sensing circuit 314.

The power transmission circuit 311 may include a power adapter 311a which receives a power source (or power) input from the outside and appropriately converts a voltage of the input power source; a power generation circuit 311b which generates power; or a matching circuit 311c which maximizes the efficiency between a transmission coil 311L and a reception coil 321L.

The power transmission circuit 311 may include at least several elements among power adapters 311a, power generation circuits 311b, transmission coils 311L, or matching circuits 311c to enable power transmission to a plurality of power reception devices (e.g., a first external electronic device and a second external electronic device).

The control circuit 312 may perform overall control of the power transmission device 302, and generate various messages required for wireless power transmission to transfer the generated messages to the communication circuit 313. The control circuit 312 may calculate a power (or an amount of power) to be transmitted to a power reception device 301, based on information received from the communication circuit 313. The control circuit 312 may control the power transmission circuit 311 such that power generated by the transmission coil 311L is transmitted to the power reception device 301.

The communication circuit 313 may include at least one of a first communication circuit 313a or a second communication circuit 313b. For example, the first communication circuit 313a may communicate with a first communication circuit 323a of the power reception device 301 by using a frequency which is the same as or adjacent to a frequency used for power transmission by the transmission coil 311L.

The first communication circuit 313a may communicate with the first communication circuit 323a by using the transmission coil 311L. Data (or a communication signal) generated by the first communication circuit 313a may be transmitted using the transmission coil 311L. The first communication circuit 313a may transmit data to the power reception device 301 by using a frequency shift keying (FSK) modulation technique. The first communication circuit 313a may communicate with the first communication circuit 323a of the power reception device 301 by changing a frequency of a power signal transmitted through the transmission coil 311L. Alternatively, the first communication circuit 313a may communicate with the first communication circuit 323a of the power reception device 301 by including data in a power signal generated by the power generation circuit 311b. For example, the first communication circuit 313a may represent data by increasing or decreasing a frequency of a power signal.

For example, the second communication circuit 313b may communicate with a second communication circuit 323b of the power reception device 301 by using a frequency different from the frequency used for power transmission by the transmission coil 311L (e.g., an outband scheme). For example, the second communication circuit 313b may use one of various short-range communication schemes such as Bluetooth™, Bluetooth™ low energy (BLE), wireless fidelity (Wi-Fi), and near field communication (NFC) to obtain information related to a charge state (e.g., a voltage value after rectification, a rectified voltage value (e.g., Vrec) information, information on a current flowing in a coil or a rectifier circuit (e.g., Iout), various packets, and/or messages) from the second communication circuit 323b.

The sensing circuit 314 may include at least one sensor, and may detect at least one state of the power transmission device 301 by using at least one sensor.

The sensing circuit 314 may include at least one of a temperature sensor, a motion sensor, or a current (or voltage) sensor, detect a temperature state of the power transmission device 302 by using the temperature sensor, detect a motion state of the power transmission device 302 by using the motion sensor, and detect a state of an output signal of the power transmission device 302, such as a current magnitude, a voltage magnitude, or a power magnitude, by using the current (or voltage) sensor.

The current (or voltage) sensor may measure a signal in the power transmission circuit 311. The current (or voltage) sensor may measure a signal in at least a portion of the matching circuit 311c or the power generation circuit 311b. For example, the current (or voltage) sensor may include a circuit for measuring a signal at the front end of the coil 311L.

The sensing circuit 314 may be a circuit for foreign object detection (FOD).

The power reception device 301 (e.g., the electronic device 101) may include a power reception circuit 321 (e.g., the power management module 188), a control circuit 322 (e.g., the processor 120), a communication circuit 323 (e.g., the communication module 190), at least one sensor 324, a display 325 or a sensing circuit 326. In relation to the power reception device 301, a description of a configuration corresponding to the power transmission device 302 may be partially omitted.

The power reception circuit 321 may include the reception coil 321L which wirelessly receives power from the power transmission device 302, a matching circuit 321a, a rectifier circuit 321b which rectifies a received alternating current (AC) power to direct current (DC), an adjusting circuit 321c which adjusts a charge voltage, a switching circuit 321d, or a battery 321e.

The control circuit 322 may perform overall control of the power transmission device 301, and generate various messages required for wireless power transmission to transmit the generated messages to the communication circuit 323.

The communication circuit 323 may include at least one of the first communication circuit 323a or the second communication circuit 323b. The first communication circuit 323a may communicate with the power transmission device 302 through the reception coil 321L.

The first communication circuit 323a may communicate with the first communication circuit 313a by using the reception coil 321L. Data (or a communication signal) generated by the first communication circuit 323a may be transmitted using the reception coil 321L. The first communication circuit 323a may transmit the data to the power transmission device 302 by using an amplitude shift keying (ASK) modulation technique. The second communication circuit 323b may communicate with the power transmission device 302 by using one of various short-range communication schemes such as Bluetooth™, BLE, Wi-Fi, and NFC.

At least one sensor 324 may include at least a part of a current/voltage sensor, a temperature sensor, an illuminance sensor, or an acceleration sensor.

The display 325 may display various display information required for wireless power transmission and reception.

The sensing circuit 326 may detect the power transmission device 302 by detecting a search signal or power received from the power transmission device 302. The sensing circuit 326 may detect a signal change of an input/output terminal of the coil 321L, the matching circuit 321a, or the rectifier circuit 321b, which is caused by a signal of the coil 321L, which is the signal being generated by the signal output from the power transmission device 302. The sensing circuit 326 may be included in the reception circuit 321.

Figure 5:
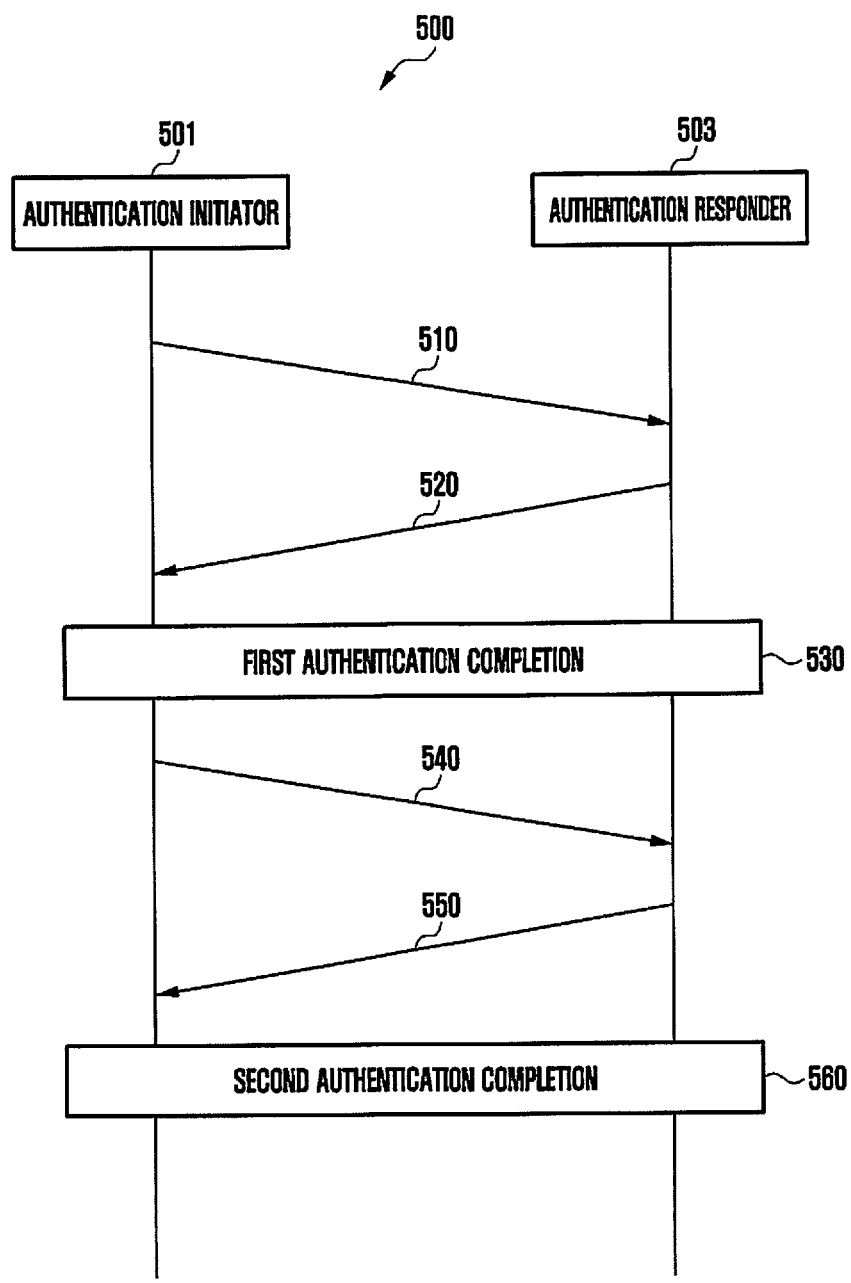
FIG. 5 is a signal flow diagram of a procedure of authenticating an electronic device according to an embodiment.

FIG. 5 is a signal flow diagram 500 relating to a procedure of authenticating an electronic device according to an embodiment.

Referring to FIG. 5, a process of transmitting or receiving authentication data between an authentication initiator 501 and an authentication responder 503 is illustrated. In general, an electronic device 101 such as a portable terminal may be the authentication initiator 501, and an external electronic device 102 such as a wireless charging pad may be the authentication responder 503. The reverse may be established as an exception. For example, the electronic device 101 such as a portable terminal may be the authentication responder 503, and the external electronic device 102 such as a wireless charging pad may be the authentication initiator 501. An example is described below in which the electronic device 101 such as a portable terminal is the authentication initiator 501 and the external electronic device 102 such as a wireless charging pad is the authentication responder 503.

In step 510, the authentication initiator 501 (e.g., an electronic device) may request identification information of the authentication responder 503 (e.g., a wireless charging pad) and/or configuration information related to wireless charging. For example, the identification information may include version information, a manufacturing code, or a basic device identifier. The configuration information may include, for example, a wireless charging frequency, a maximum chargeable power, a required charge amount, or an average transmission power amount.

In step 520, the authentication responder 503 may transmit the identification information and/or configuration information to the authentication initiator 501. The authentication responder 503 may generate a power transfer contract used for power charging with the authentication initiator 501, based at least in part on the received identification information and/or configuration information. For example, the power transfer contract may include limits of parameters which determine power transfer characteristics in a power transfer state. The limits may include a method for determining version information of the power transfer contract, identification information of the authentication responder 503 or a manufacturer, a power class, expected maximum power information, option configuration, time information for average reception power, or a current of a main cell of the authentication responder 503.

A direction of the request for the identification information and configuration information may be the reverse of the above example. For example, the authentication responder 503 may transmit identification or configuration information to the authentication initiator 501, and then the authentication initiator 501 may make a request for changing a charging power amount, based on the received configuration information. As another example, in a case of fast charging, the authentication initiator 501 may request identification or configuration information from the authentication responder 503, the authentication initiator 501 may make a request for controlling an amount of power, based on the information, and the authentication responder 503 may configure (change) the amount of power according to the request. As another example, after the authentication responder 503 transmits the identification or configuration information, the authentication initiator 501 may request a power control in response to the transmitted information, and the authentication responder 503 may configure (change) an amount of power.

In step 530, the authentication initiator 501 may determine whether wireless charging is possible, based on identification information obtained from the authentication responder 503 and/or configuration information related to wireless charging. The authentication initiator 501 may determine that wireless charging is possible, and, thus, complete a first authentication.

In step 540, the authentication initiator 501 may request a second authentication from the authentication responder 503 as encryption authentication for higher-speed wireless charging.

The identification information may be encrypted based on a predetermined encryption scheme between the authentication initiator 501 and the authentication responder 503. For example, the identification information may be implemented as an anonymous data packet.

A signal for requesting anonymous identification information and/or a response signal may be encrypted based on a predetermined encryption scheme between the authentication initiator 501 and the authentication responder 503. For example, the response signal may be generated as an anonymous data packet. The authentication initiator 501 may perform encryption on the identification information by using a predefined encryption scheme, generate anonymous identification information, and transmit the anonymous identification information to the authentication responder 503. For example, the authentication initiator 501 may encrypt identification information by using various schemes, and may transmit the encrypted identification information to the authentication responder 503. The authentication initiator 501 encrypts and transmits identification information, so as to prevent other electronic devices from identifying the identification information, thereby enhancing security.

The authentication initiator 501 may transmit or receive data related to anonymous identification information and receive wireless power in a changed charging mode. For example, the authentication initiator 501 may receive power in a charging mode (e.g., a higher fast wireless charging mode) corresponding to the anonymous identification information and control a battery to be charged. The order and direction of operations between the authentication initiator 501 and the authentication responder 503 may be changed unlike the above example.

The authentication initiator 501 may transmit, to the authentication responder 503, a signal for requesting anonymous identification information (including encrypted one-time random numbers).

The anonymous identification information may be encrypted data associated with an ID and a power mode change. The anonymous identification information disclosed herein may include an encrypted one-time random number, for example, one-time data (instant and disposable data) generated using a one-time random number.

The authentication initiator 501 may request the authentication responder 503 to transfer a certificate chain. The certificate chain may include public authentication message information corresponding to each of a root authority which provides the security system for authentication, a manufacturer which is certified by the corresponding root authority, and individual products (e.g., a wireless charging pad) for the corresponding manufacturer. An individual public authentication message may form a unique pair with a private authentication message through encryption of an authentication security system. The private authentication message may be used in a process of encrypting or decrypting message data in a pair (e.g., a power transmitter and a power receiver) of an electronic device to be authenticated, respectively. The certificate chain may include information relating to a public authentication message (e.g., information on a root authority which provides the security system for authentication, a manufacturer which is certified by the corresponding root authority, or at least one of individual products of the corresponding manufacturer). Such a certificate chain may be paired with a private authentication message corresponding to the public authentication message. As described above, since the amount of data in the certificate chain required for wireless charging authentication is large, it is necessary to involve distributed transmission of data related to the wireless charging authentication.

In step 550, the authentication responder 503 may transfer a certificate chain to the authentication initiator 501 in response to the second authentication request. For example, the authentication responder 503 may transmit information on the certificate chain to the authentication initiator 501, through division of data relating to the wireless charging authentication, by using a start tag and an end tag.

The authentication initiator 501 may verify whether the received certificate chain is valid in step 560. For example, the authentication initiator 501 may determine that the second authentication fails if the certificate chain is not valid, and may receive low power (e.g., the first predetermined power) provided from the authentication responder 503. Accordingly, the general wireless charging mode or the fast wireless charging mode may be performed. The authentication initiator 501 may receive power (e.g., high power (second predetermined power)) provided from the authentication responder 503 if the certificate chain is valid. Accordingly, the authentication initiator 501 may perform a higher fast wireless charging mode.

Figure 6:
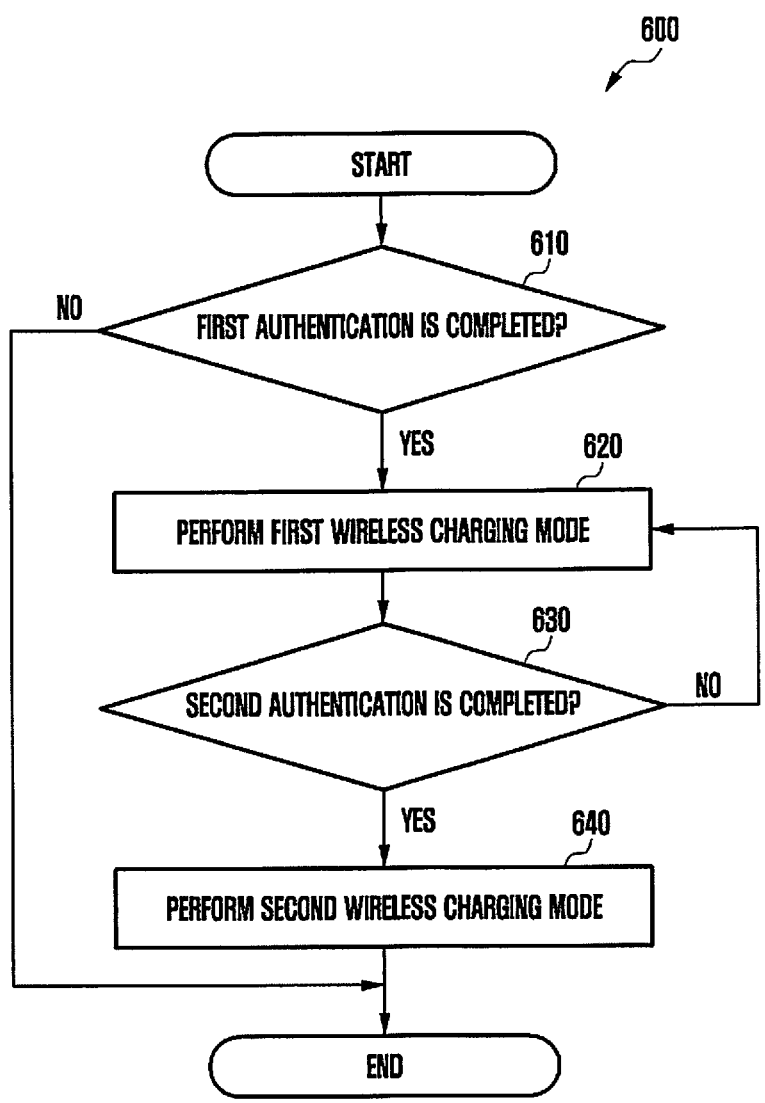
FIG. 6 is a flowchart of a method for performing different power transmission/reception modes according to an authentication level of an electronic device according to an embodiment.

FIG. 6 is a flowchart 600 relating to a method for performing different power transmission/reception modes according to an authentication level of an electronic device according to an embodiment.

Referring to FIG. 6, in step 610, an electronic device 101 (e.g., a portable terminal) and an external electronic device 102 (e.g., a wireless charging pad) may determine whether a first authentication for wireless charging is completed. For example, the electronic device 101 may request identification information and/or configuration information related to wireless charging from the external electronic device 102, and determine whether wireless charging is possible, based on the identification information and/or the configuration information related to wireless charging, which are obtained from the external electronic device 102, as a response to the request. The electronic device 101 may complete the first authentication by determining that the wireless charging with the external electronic device 102 is possible. The process of performing the first authentication in step 610 may be the same as or similar to steps 510 to 530 illustrated in FIG. 5.

If the first authentication for wireless charging is completed (e.g., a result of the determination in step 610 is YES), the electronic device 101 and the external electronic device 102 may branch to step 620 so as to activate a first wireless charging mode corresponding to a general wireless charging mode or a fast wireless charging mode. For example, the electronic device 101 may request the external electronic device 102 to transmit a first predetermined power.

In step 630, the electronic device 101 may additionally request the external electronic device 102 for a second authentication for higher fast wireless charging.

In step 630, the electronic device 101 may determine whether to perform the second authentication, based on the identification information obtained in steps 610 and 620. For example, the electronic device 101 may determine whether the external electronic device 102 is a device which can transmit a maximum of the first predetermined power or a device which can transmit a second predetermined power, based on the identification information. Since the second predetermined power is, for example, power supporting higher fast wireless charging, the electronic device 101 may additionally require the second authentication prior to the transmission of the second predetermined power, if the external electronic device 102 transmits identification information enabling transmission of the second predetermined power. If the second authentication fails, although the external electronic device 102 includes identification information enabling transmission of the second predetermined power, the electronic device 101 may transmit, to the external electronic device 102, a command for transmitting the first predetermined power lower than the second predetermined power. As a result obtained by identifying the identification information, if the external electronic device 102 is a device which can transmit a maximum of the first predetermined power, the electronic device 101 may bypass a second authentication procedure and transmit, to the external electronic device 102, the command for transmitting the first predetermined power.

The electronic device 101 may transmit, to the external electronic device 102, for example, a signal for requesting anonymous identification information as information required for performing higher fast wireless charging. The identification information may be encrypted based on a predetermined encryption scheme between the authentication initiator 501 and the authentication responder 503. For example, the identification information may be implemented as an anonymous data packet. If the external electronic device 102 transmits the anonymous data packet as a response to the signal for requesting the anonymous identification information, the electronic device 101 may determine whether the anonymous data packet includes predefined information, and if the anonymous data packet includes the predefined information, the electronic device 101 may determine that the second authentication for performing higher fast wireless charging is completed.

The electronic device 101 may request the external electronic device 102 to transfer a certificate chain. If the electronic device 101 receives the certificate chain from the external electronic device 102, the electronic device 101 may verify whether the certificate chain is valid. For example, if the certificate chain is not valid, the electronic device 101 may determine that the second authentication fails. If the certificate chain is valid, the electronic device 101 may determine that the second authentication is completed.

The process of performing the second authentication in step 630 may be the same as or similar to steps 540 to 560 illustrated in FIG. 5.

If the second authentication for higher fast wireless charging is completed (e.g., a result of the determination in step 630 is YES), the electronic device 101 and the external electronic device 102 may branch to step 640 so as to activate a second wireless charging mode corresponding to a higher fast wireless charging mode. For example, the electronic device 101 may request the external electronic device 102 to transmit the second predetermined power that is higher than the first predetermined power supported in the first wireless charging mode.

If the second authentication for higher fast wireless charging fails (e.g., a result of the determination in step 630 is NO), the electronic device 101 and the external electronic device 102 may branch to step 620 so as to activate the first wireless charging mode corresponding to the general wireless charging mode or the fast wireless charging mode and then terminate the same. For example, the electronic device 101 may request the external electronic device 102 to transmit the first predetermined power which is relatively low power.

According to an embodiment, a method for wirelessly charging an electronic device may include through a wireless charging circuit, requesting configuration information for performing wireless charging from an external device so as to determine whether the wireless charging is possible; if the wireless charging is possible, requesting encrypted authentication information from the external device so as to perform authentication with respect to the external device; if the external device is an unauthenticated device, requesting the external device to transmit a first predetermined power; and if the external device is an authenticated device, requesting the external device to transmit a second predetermined power higher than the first predetermined power. The operation of determining whether the wireless charging is possible may include requesting identification information from the external device; receiving the identification information of the external device from the external device; and determining whether the external device is a device which can transmit a maximum of the first predetermined power or a device which can transmit a maximum of the second predetermined power, based on the identification information of the external device. The method may include if the external device can transmit a maximum of the second predetermined power, requesting the encrypted authentication information from the external device; and if the external device can transmit a maximum of the first predetermined power, requesting the external device to transmit the first predetermined power. The method may include transmitting the request for the first predetermined power to the external device, based on the identification information of the external device; charging a battery, based on the transmission of the first predetermined power by the external device; and requesting the encrypted authentication information from the external device while charging the battery, based on the transmission of the first predetermined power.

Figure 7A:
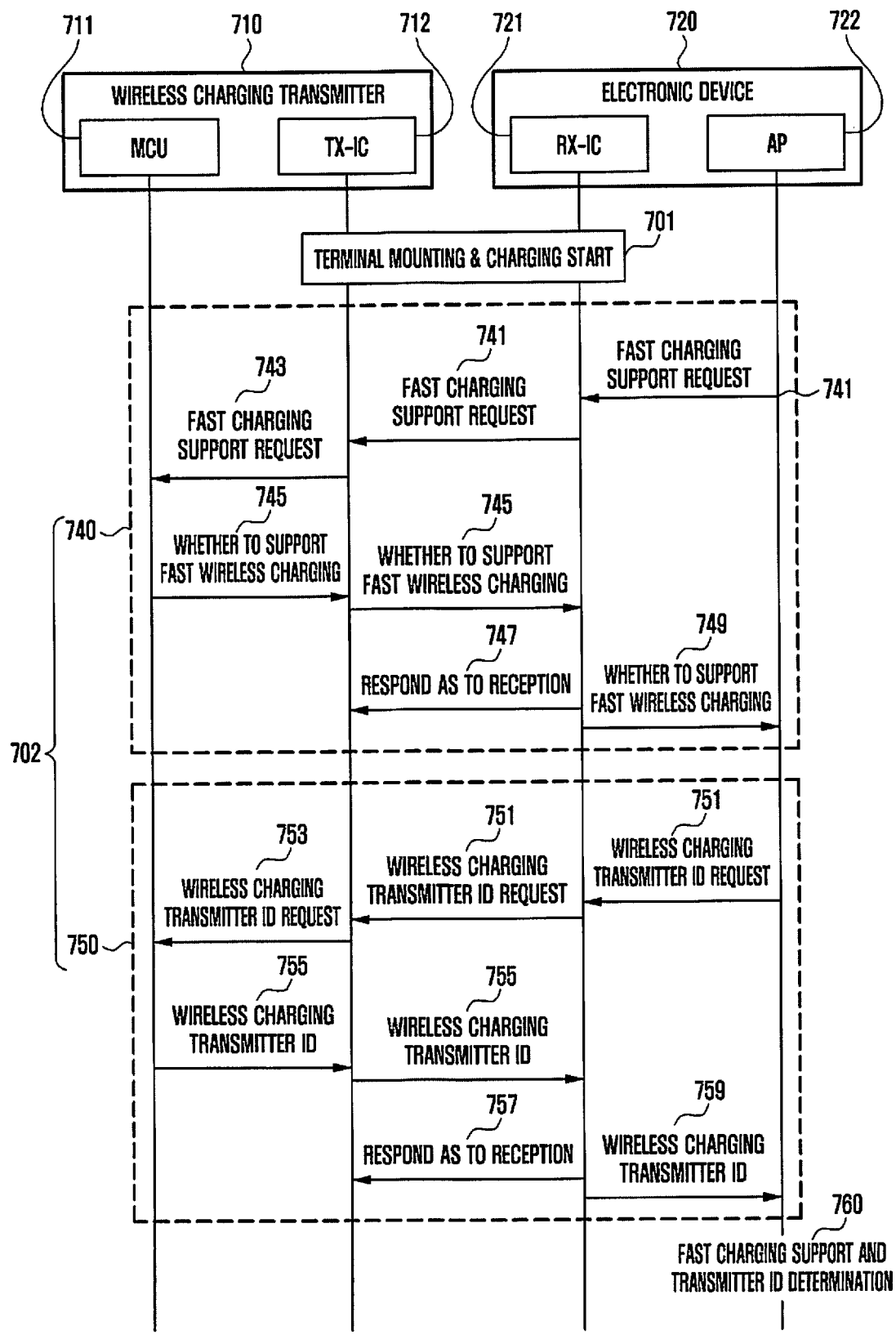
FIG. 7A is a signal flow diagram of an operation of a wireless charging system according to an embodiment.
Figure 7B:
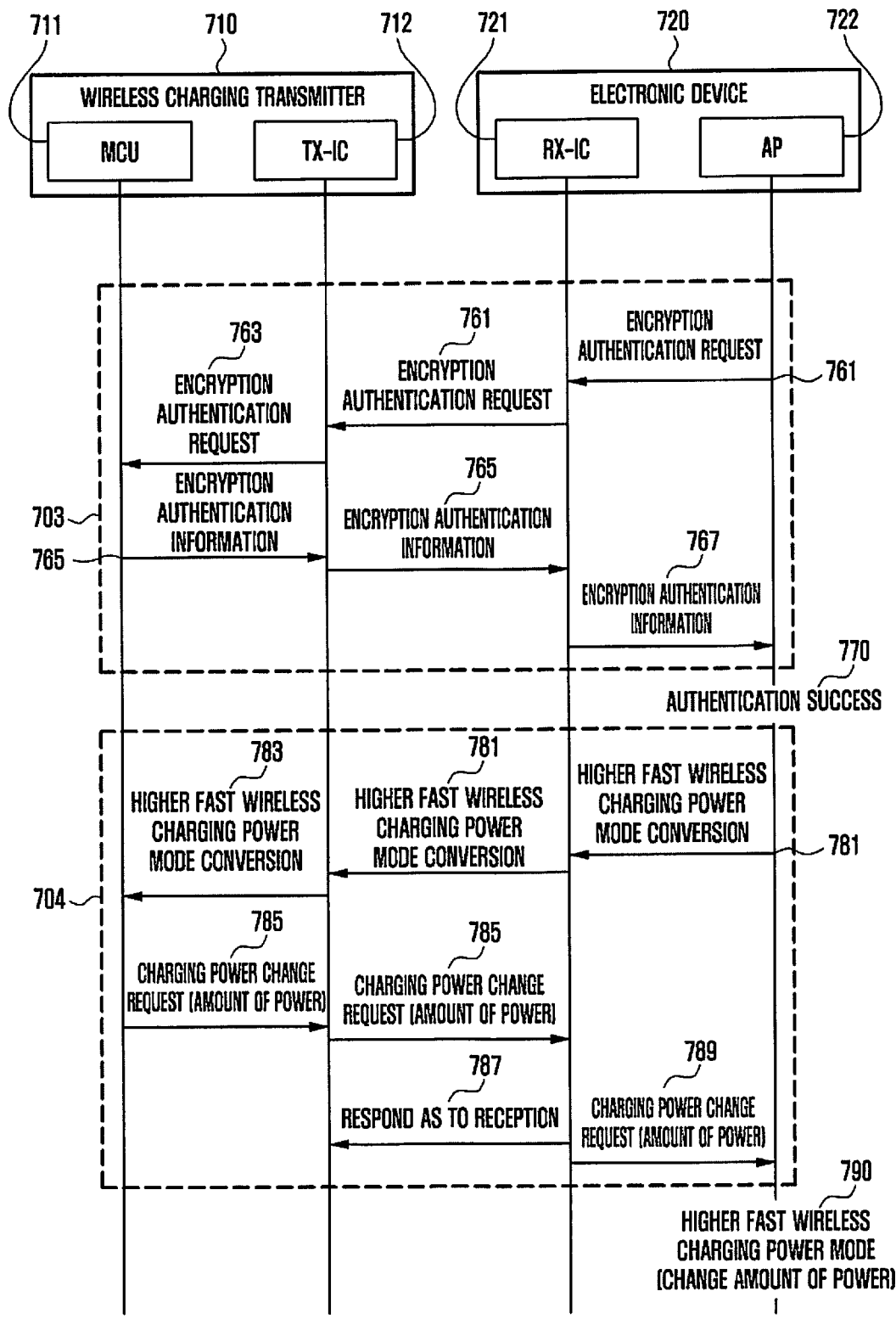
FIG. 7B is a signal flow diagram of an operation of a wireless charging system according to an embodiment.

FIG. 7A is a signal flow diagram of an operation of a wireless charging system according to an embodiment, and FIG. 7B is a signal flow diagram of an operation of the wireless charging system according to an embodiment. FIG. 7B may be a signal flow diagram of a subsequent operation of step 759 of FIG. 7A.

Referring to FIG. 7A, a wireless charging system may include a wireless charging transmitter 710 (e.g., the external electronic device 302), and an electronic device 720 (e.g., the electronic device 301). For example, the wireless charging transmitter 710 may include a control circuit 711 (e.g., a multipoint control unit (MCU)), or a wireless charging transmission circuit 712 (e.g., a transmission integrated circuit (TX-IC)), and the electronic device 720 may include a wireless charging reception circuit 721 (e.g., a reception integrated circuit (RX-IC)), or a processor 722 (e.g., an application processor (AP)).

In step 701, if the electronic device 720 is mounted on a pad of the wireless charging transmitter 710, a configuration for performing wireless charging may be started. For example, in step 701, the wireless charging transmitter 710 and the electronic device 720 may perform in-band communication according to a predetermined standard (e.g., a Wireless Power Consortium (WPC) standard), and step 701 may include operations in which the electronic device 720 exchanges information required for wireless power transmission with the wireless charging transmitter 710. For example, wireless charging in accordance with the WPC standard may include a ping operation, an identification and configuration operation, or a power transfer operation. The ping operation may be an operation of determining whether the electronic device 720 is placed on a wireless charging pad, and for example, an operation of determining whether the electronic device 720 is close to the wireless charging transmitter 710. In the identification and configuration operation, the wireless charging transmitter 710 and the electronic device 720 may exchange identification information for power transmission through the in-band communication. Alternatively, for example, the electronic device 720 which configures a power transmission amount may determine a designated wireless power to be transmitted by the wireless charging transmitter 710. The power transfer operation may be an operation of transmitting the designated wireless power, for example, an operation in which the wireless charging transmitter 710 transmits the determined wireless power (e.g., power corresponding to general wireless charging) to the electronic device 720.

In step 702, the electronic device 720 may determine whether fast wireless charging is possible, based on a result obtained by exchanging configuration information for performing fast wireless charging with the wireless charging transmitter 710. For example, step 702 may be the same as or similar to steps 510 to 530 illustrated in FIG. 5.

Step 702 may include step 740 in which the electronic device 720 exchanges information with the wireless charging transmitter 710 to determine whether the wireless charging transmitter 710 supports fast wireless charging, and step 750 in which if the wireless charging transmitter 710 is determined to support fast wireless charging, the electronic device 720 requests identification information and/or configuration information related to wireless charging from the wireless charging transmitter 710.

In step 740, the processor 722 of the electronic device 720 may transmit a fast charging support request to the wireless charging transmitter 710 through the wireless charging reception circuit 721 in step 741, and the wireless charging transmission circuit 712 of the wireless charging transmitter 710 may transfer the received fast charging support request to the control circuit 711 in step 743. The control circuit 711 of the wireless charging transmitter 710 may transmit, to the electronic device 720, information related to whether to support fast wireless charging through the wireless charging transmission circuit 712 in response to the received fast charging support request in step 745. If the wireless charging reception circuit 721 of the electronic device 720 receives information related to whether to support fast wireless charging, the wireless charging reception circuit 721 may respond to the wireless charging transmitter 710 as to whether the information is received in step 747. If the wireless charging reception circuit 721 of the electronic device 720 receives information related to whether to support fast wireless charging, the wireless charging reception circuit 721 may transmit the received information to the processor 722 in step 749.

In step 750, if the wireless charging transmitter 710 is determined to support fast wireless charging, the processor 722 of the electronic device 720 may transmit a wireless charging identification (ID) request of the wireless charging transmitter 710 to the wireless charging transmitter 710 through the wireless charging reception circuit 721 in step 751. The wireless charging transmission circuit 712 of the wireless charging transmitter 710 may transmit, to the control circuit 711, the received wireless charging transmitter identification request of the wireless charging transmitter 710 in step 753. The control circuit 711 of the wireless charging transmitter 710 may transmit wireless charging transmitter identification information and/or configuration information to the electronic device 720 through the wireless charging transmission circuit 712 in response to the received wireless charging identification request of the wireless charging transmitter 710 in step 755. If the wireless charging reception circuit 721 of the electronic device 720 receives the wireless charging transmitter identification and/or the configuration information, the wireless charging reception circuit 721 may respond to the wireless charging transmitter 710 as to whether the information is received in step 757. If the wireless charging reception circuit 721 of the electronic device 720 receives the wireless charging transmitter identification and/or the configuration information, the wireless charging reception circuit 721 may transmit the received information to the processor 722 in step 759. A fast charging support and transmitter identification determination may be made in step 760.

The identification information may include version information, a manufacturing code, or a basic device identifier. The identification information may include predefined information for identifying whether the wireless charging transmitter 710 is a device which can perform encryption authentication. The configuration information may include, for example, at least a part of a wireless charging frequency, a maximum chargeable power, a required charging power amount, and/or an average transmission power amount.

The processor 722 of the electronic device 720 may determine whether fast wireless charging is possible, based on the received identification information and/or configuration information of the wireless charging transmitter 710. For example, the processor 722 of the electronic device 720 may determine whether the wireless charging transmitter 710 is a device which can transmit a maximum of a first predetermined power or a device which can transmit a second predetermined power, based on the received identification information of the wireless charging transmitter 710. Since the second predetermined power is, for example, power supporting higher fast wireless charging, if the identification information of the wireless charging transmitter 710 corresponds to a device which can transmit the second predetermined power, the processor 722 may additionally request encryption authentication before a request for transmitting the second predetermined power. If the encryption authentication fails, although the wireless charging transmitter 710 has transmitted identification information corresponding to the device which can transmit the second predetermined power, the electronic device 101 may transmit, to the external electronic device 102, a command for transmitting the first predetermined power that is lower than the second predetermined power. That is, an example of FIG. 7B described below may be a process that is performed in a case where the wireless charging transmitter 710 has transmitted identification information corresponding to the device which can transmit the second predetermined power. If the wireless charging transmitter 710 does not transmit identification information corresponding to a device which can transmit the second predetermined power (for example, if the wireless charging transmitter 710 transmits identification information corresponding to a device which can transmit a maximum of the first predetermined power), encryption authentication procedures in steps 703 and 704 illustrated in FIG. 7B may be bypassed, and the electronic device 101 may transmit, to the wireless charging transmitter 710, the command for transmitting the first predetermined power.

Referring to FIG. 7B, if the processor 722 of the electronic device 720 determines that fast wireless charging is possible with the wireless charging transmitter 710, the processor 722 may branch to step 703 so as to proceed to an encryption authentication process for determining whether the higher fast wireless charging is possible with the wireless fast charging transmitter 710. For example, step 703 may be the same as or similar to steps 540 to 560 illustrated in FIG. 5.

In step 703, the processor 722 of the electronic device 720 may transmit an encryption authentication request to the wireless charging transmitter 710 through the wireless charging reception circuit 721 in step 761. The wireless charging transmission circuit 712 of the wireless charging transmitter 710 may transfer the received encryption authentication request to the control circuit 711 in step 763. The control circuit 711 of the wireless charging transmitter 710 may transmit encryption authentication information to the electronic device 720 through the wireless charging transmission circuit 712 in response to the received encryption authentication request in step 765. If the encryption authentication information is received, the wireless charging reception circuit 721 of the electronic device 720 may transfer the received encryption authentication information to the processor 722 in step 767.

The processor 722 of the electronic device 720 may determine whether the encryption authentication information received from the wireless charging transmitter 710 is valid by using an encryption authentication module. For example, if the received encryption authentication information is valid, the processor 722 of the electronic device 720 may determine that authentication has been passed (or succeeded) in step 770. The encryption authentication module may be embedded in the processor 722 of the electronic device 720. As another example, the encryption authentication module may be implemented as an integrated circuit (or chip) separate from the processor 722 of the electronic device 720.

If encryption authentication through the encryption authentication module passed, the processor 722 of the electronic device 720 may perform step 704 for configuring the amount of power corresponding to higher fast wireless charging.

In step 704, the processor 722 of the electronic device 720 may transmit a command for converting to a higher fast wireless charging mode to the wireless charging transmitter 710 through the wireless charging reception circuit 721 in step 781. For example, the wireless charging transmission circuit 712 of the wireless charging transmitter 710 may transfer the command for converting to the higher fast wireless charging mode to the control circuit 711 in step 783. In response to reception of the command for converting to the higher fast wireless charging mode, the control circuit 711 may transmit a charging power change request including information on the amount of transmittable power to the electronic device 720 through the wireless charging transmission circuit 712 in step 785.

If the charging power change request is received, the wireless charging reception circuit 721 of the electronic device 720 may respond to the wireless charging transmitter 710 as to whether the information is received in step 787. If the charging power change request is received, the wireless charging reception circuit 721 of the electronic device 720 may transfer the received charging power change request to the processor 722 in step 789.

In step 790, the processor 722 may determine a charging power corresponding to the higher fast wireless charging mode in response to the charging power change request, and proceed to higher fast wireless charging, based on the determined charging power. For example, the processor 722 of the electronic device 720 may control the wireless charging reception circuit 721 to request power from the wireless charging transmitter 710, based on the determined amount of charging power.

The wireless charging transmission circuit 712 of the wireless charging transmitter 710 may transfer, to the control circuit 711, an identification information request command for conversion to a higher fast wireless charging mode in step 783. In response to reception of the identification information request for conversion to the higher fast wireless charging mode, the control circuit 711 may transmit identification information for conversion to the higher fast wireless charging mode to the electronic device 720 through the wireless charging transmission circuit 712 in step 785.

If the identification information for conversion to the higher fast wireless charging mode is received, the wireless charging reception circuit 721 of the electronic device 720 may respond to the wireless charging transmitter 710 as to whether the information is received. Alternatively, the request for the higher fast wireless charging mode or the charging power may be forwarded based on the received identification information in step 787. The wireless charging reception circuit 721 of the electronic device 720 may transfer the received charging power change request to the processor 722 in step 789.

Figure 8:
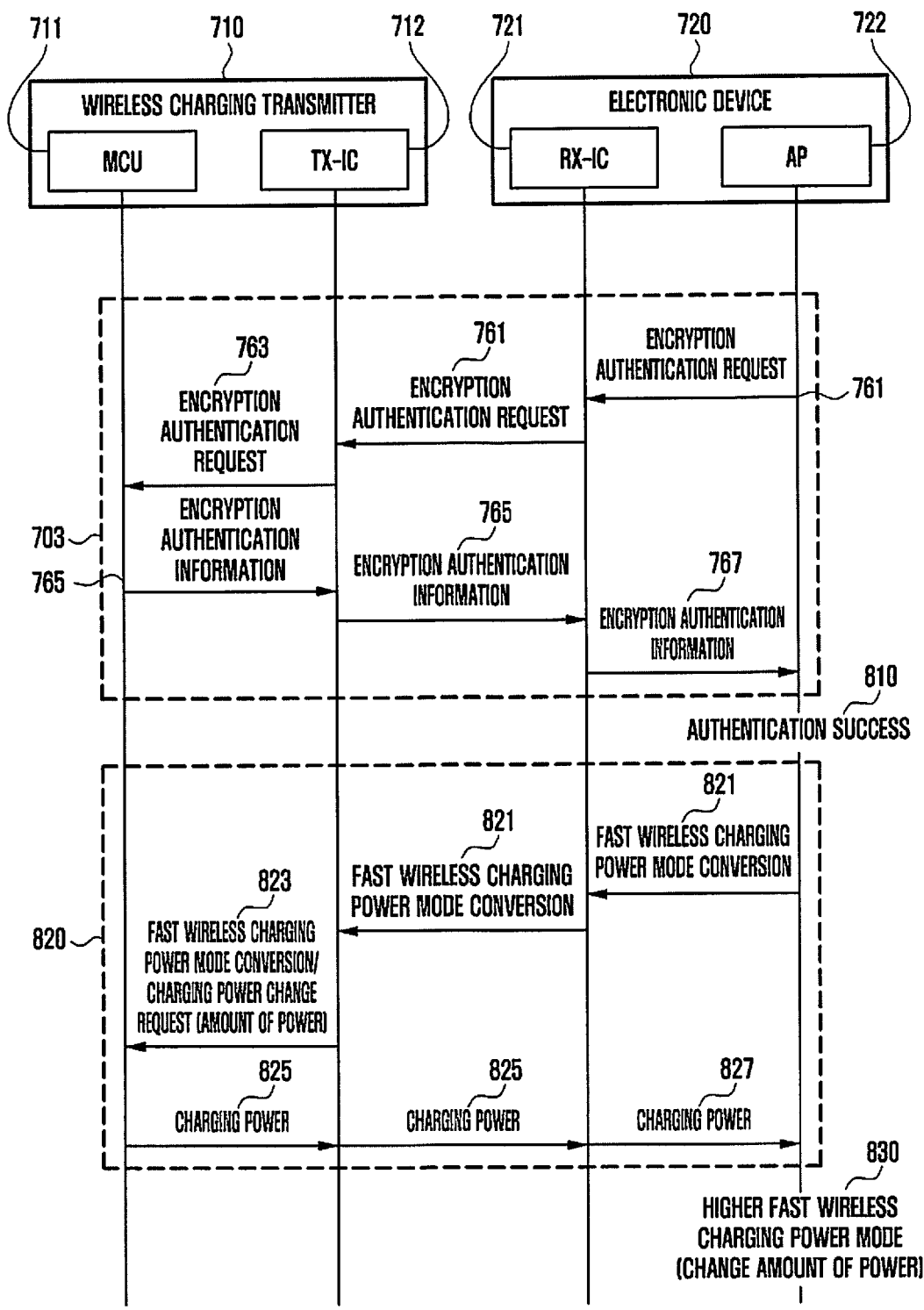
FIG. 8 is a signal flow diagram of an operation in a case where encryption authentication fails.

FIG. 8 is a signal flow diagram of an operation in a case where encryption authentication fails. FIG. 8 may be a signal flow diagram of a subsequent operation of step 759 of FIG. 7A. Operations before step 810 illustrated in FIG. 8 may be substantially the same as operations before step 770 illustrated in FIG. 7B. Therefore, step 810 and subsequent operations of FIG. 8 are described hereinafter.

Referring to FIG. 8, in step 810, if the received encryption authentication information is not valid, the processor 722 of the electronic device 720 may determine that authentication did not pass (e.g., authentication failed), and perform step 820 for performing general wireless charging or fast wireless charging.

In step 820, the processor 722 of the electronic device 720 may transmit, to the wireless charging transmitter 710, a command for converting to a fast wireless charging mode (or a general wireless charging mode) through the wireless charging reception circuit 721 in step 821. The wireless charging transmission circuit 712 of the wireless charging transmitter 710 may transfer, to the control circuit 711, the command for converting to the fast wireless charging mode (or the general wireless charging mode) in step 823. In response to reception of the command for converting to the fast wireless charging mode (or the general wireless charging mode), the control circuit 711 may transmit a charging power corresponding to the fast wireless charging mode (or the general wireless charging mode) to the electronic device 720 through the wireless charging transmission circuit 712 in step 825. The wireless charging reception circuit 721 of the electronic device 720 may transfer the received charging power to the processor 722 in step 827.

In step 830, the electronic device 720 may charge the battery in the fast wireless charging mode (or the general wireless charging mode) based on the transmission of the charging power corresponding to the fast wireless charging mode (or the general wireless charging mode) by the wireless charging transmitter 710. For example, the processor 722 of the electronic device 720 may control the wireless charging reception circuit 721, so as to request power from the wireless charging transmitter 710, based on the amount of power supported in the fast wireless charging mode (or the general wireless charging mode).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
a battery;
a coil;
a wireless charging circuit electrically connected to the coil;
a power management module configured to control a charge state of the battery by using power supplied from a receiving circuit; and
a processor operatively connected to the wireless charging circuit and the power management module,
wherein the processor is configured to:
request identification information from an external device;
receive the identification information of the external device from the external device; and
determine whether the external device can transmit a first predetermined power or a second predetermined power higher than the first predetermined power based on the identification information of the external device;
in response to determining that the external device can transmit the second predetermined power, request encrypted authentication information from the external device so as to perform authentication with respect to the external device;
when the external device is an unauthenticated device, request the external device to transmit a first predetermined power regardless of whether the external device is configured to transmit the second predetermined power; and
when the external device is an authenticated device, request the external device to transmit a second predetermined power that is higher than the first predetermined power.

2. The device of claim 1, wherein the processor is further configured to:
when the external device can transmit a maximum of the first predetermined power, request the external device to transmit the first predetermined power.

3. The device of claim 1, wherein the processor is further configured to:
transmit a request for the first predetermined power to the external device, based on the identification information of the external device;
charge the battery, based on the transmission of the first predetermined power by the external device; and
request the encrypted authentication information from the external device while charging the battery, based on the transmission of the first predetermined power.

4. The device of claim 1, wherein the processor is further configured to:
determine whether wireless charging is possible, based on the configuration information of the external device; and
when wireless charging is possible, determine whether the external device can perform fast wireless charging, based on the identification information of the external device.

5. The device of claim 1, further comprising an encryption authentication module configured to perform the authentication.

6. The device of claim 5, wherein the encryption authentication module is embedded in the processor.

7. A wireless charging transmitter, comprising:
a coil;
a wireless charging circuit electrically connected to the coil; and
a controller operatively connected to the wireless charging circuit,
wherein the controller is configured to:
when the controller receives a request for performing wireless charging from a wireless charging receiver, transmit configuration information to the wireless charging receiver;
when the wireless charging receiver requests identification information as a response to the transmission of the configuration information, transmit the identification information including information on a maximum transmittable wireless power;
receive a request for encrypted authentication information from the wireless charging receiver, as a response to the transmission of the identification information;
transmit the encrypted authentication information in response to the request for the encrypted authentication information;
when the wireless charging receiver transmits an authentication completion message as a response to the transmission of the encrypted authentication information, transmit a second predetermined power to the wireless charging receiver; and
when the wireless charging receiver transmits an authentication failure message as a response to the transmission of the encrypted authentication information, transmit a first predetermined power that is lower than the second predetermined power to the wireless charging receiver regardless of the wireless charging transmitter is configured to transmit the second predetermined power.

8. The transmitter of claim 7, wherein the maximum transmittable wireless power is the first predetermined power or the second predetermined power.

9. The transmitter of claim 8, wherein the controller is further configured to receive the request for the encrypted authentication information from the wireless charging receiver, based on transmitting the maximum transmittable wireless power as the second predetermined power.

10. The transmitter of claim 8, wherein the controller is further configured to, when the maximum transmittable wireless power is the first predetermined power, transmit, to the wireless charging receiver, a command for configuring a transmission power as the first predetermined power.

11. The transmitter of claim 7, wherein the controller is further configured to:
receive the request for the encrypted authentication information while transmitting the first predetermined power to the wireless charging receiver; and
transmit the encrypted authentication information in response to the request.

12. A method for wirelessly charging an electronic device, comprising:
through a wireless charging circuit, requesting identification information from an external device;
receiving the identification information of the external device from the external device;
determining whether the external device can transmit a first predetermined power or a second predetermined power, based on the identification information of the external device;
in response to determining that the external device can transmit the second predetermined power, requesting encrypted authentication information from the external device so as to perform authentication with respect to the external device;
when the external device is an unauthenticated device, requesting the external device to transmit a first predetermined power regardless of whether the external device is configured to transmit the second predetermined power; and
when the external device is an authenticated device, requesting the external device to transmit a second predetermined power that is higher than the first predetermined power.

13. The method of claim 12, comprising:
when the external device can transmit a maximum of the first predetermined power, requesting the external device to transmit the first predetermined power.

14. The method of claim 12, comprising:
transmitting a request for the first predetermined power to the external device, based on the identification information of the external device;
charging a battery, based on the transmission of the first predetermined power by the external device; and
requesting the encrypted authentication information from the external device while charging the battery, based on the transmission of the first predetermined power.

* * * * *